Oct. 27, 1964                E. W. RICCIO                3,153,863
                        TEACHING AND TESTING DEVICE
Filed March 12, 1962                                4 Sheets-Sheet 1

INVENTOR.
EDWARD W. RICCIO

INVENTOR.
EDWARD W. RICCIO

Oct. 27, 1964   E. W. RICCIO   3,153,863
TEACHING AND TESTING DEVICE
Filed March 12, 1962   4 Sheets-Sheet 3

INVENTOR.
EDWARD W. RICCIO
BY
Walter L. Wessendorf Jr.
attorney

Oct. 27, 1964      E. W. RICCIO      3,153,863

TEACHING AND TESTING DEVICE

Filed March 12, 1962      4 Sheets-Sheet 4

3. In the RMA color code, the digit (3) is denoted by the color     A   B   C   D
    Ans. a-Yellow   b-Blue   c-Grey   d-Orange 4. In the RMA color code the digit four (4), is denoted by the color Ans. _____

Ans. _4 Yellow_

8. In the RMA color code the digit eight (8) is denoted by the color

Ans. _____

Ans. _8 Grey_

9. In the RMA color code, 10% tolerance is denoted by the colors     A   B   C   D
a-Blue   b-Red   c-none   d-Silver

MASTER CODE SHEET    85

|    | 1 | 2 | 3 | 4 | 5 | 6 | 7 | 8 | 9 | 10 |
|----|---|---|---|---|---|---|---|---|---|----|
| W1 | A | C | B | D | B | A | C | D | B | A  |
| W2 | C | B | A | C | B | D | C | B | A | B  |
| W3 | D | C | C | B | A | D | C | B | A | D  |

INVENTOR.
EDWARD W. RICCIO
BY
*Walter F. Wessendorf Jr.*
*attorney*

United States Patent Office 3,153,863
Patented Oct. 27, 1964

1

3,153,863
TEACHING AND TESTING DEVICE
Edward W. Riccio, New Scotland, N.Y.
(R.D. 2, Voorheesville, N.Y.)
Filed Mar. 12, 1962, Ser. No. 178,855
19 Claims. (Cl. 35—9)

This invention relates to a device to aid learning.

One of the objects of this invention is to provide a device to facilitate the giving of multiple choice and constructive response examinations, optionally restricted to either type or in combination, and the marking of same.

Another object of this invention is to provide a standard 8½ by 11 inch card divided into zones of either multiple choice and constructive response questions and/or combinations of same.

A further object of this invention is to provide a frame to receive the card and with which are associated sliding rules to permit one zone of question or questions to be worked on at one time.

A still further object of the invention is to provide a coded rule for use with the frame and the multiple choice questions of the card to indicate the correctness of the answer.

Another object of the invention is to provide a master code sheet for use with the coded rule in order to make up multiple choice examinations.

The inclusive object of this invention is to provide a device that is for all intents and purposes "cheat-proof," and requires only a pencil to operate.

These and other objects of the invention should be appreciated from the detailed specification taken in conjunction with the drawings, in which, like reference numerals refer to similar parts throughout the several views, in which:

FIG. 10 is a fragmental, top plan view of the card;

FIG. 11 is another fragmental, top plan view of the card;

FIG. 12 is a fragmental, top plan view of the master code sheet.

Figure 1:
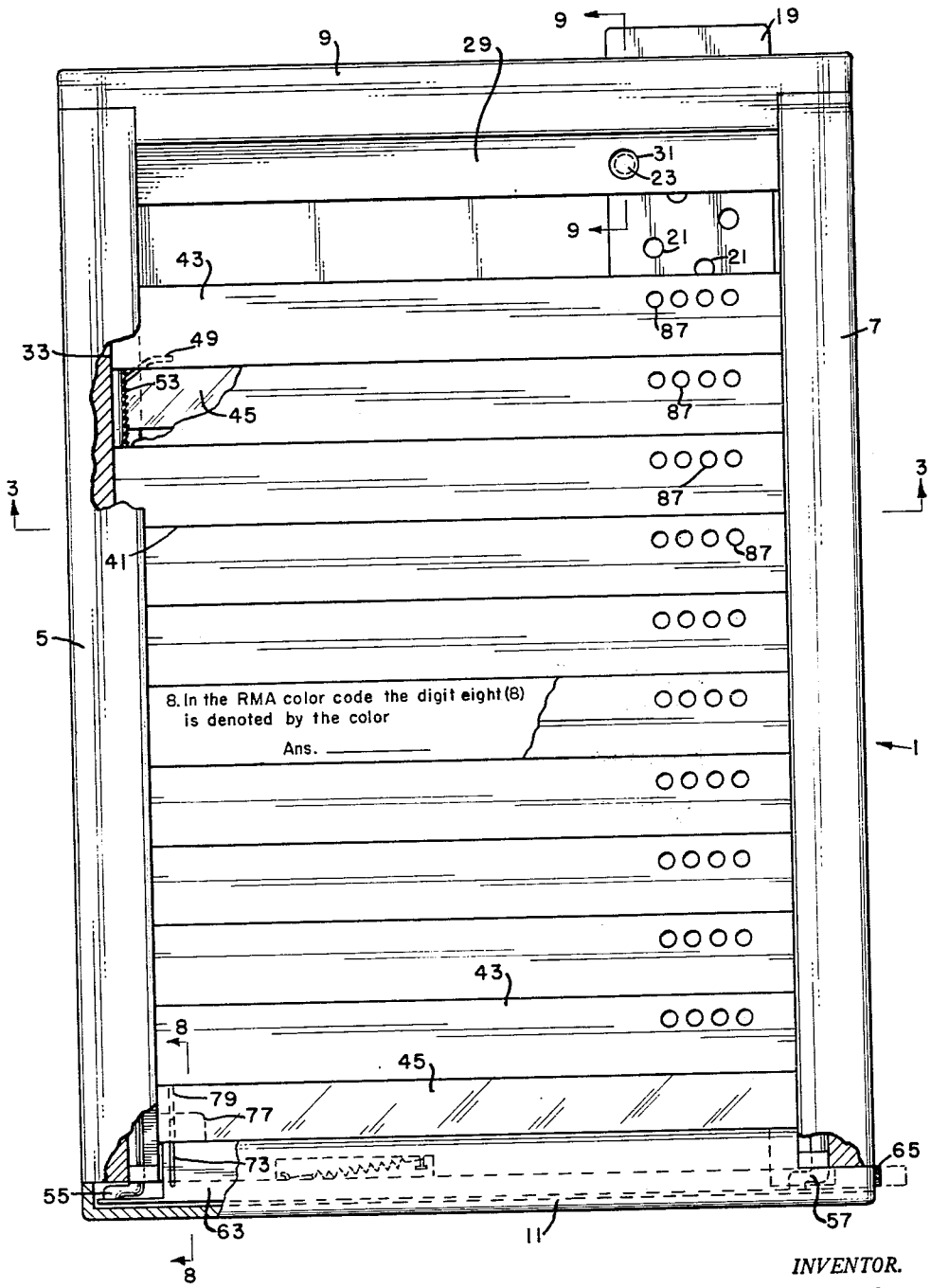
FIG. 1 is a top plan view of the inevntion, partly in section.
Figure 2:
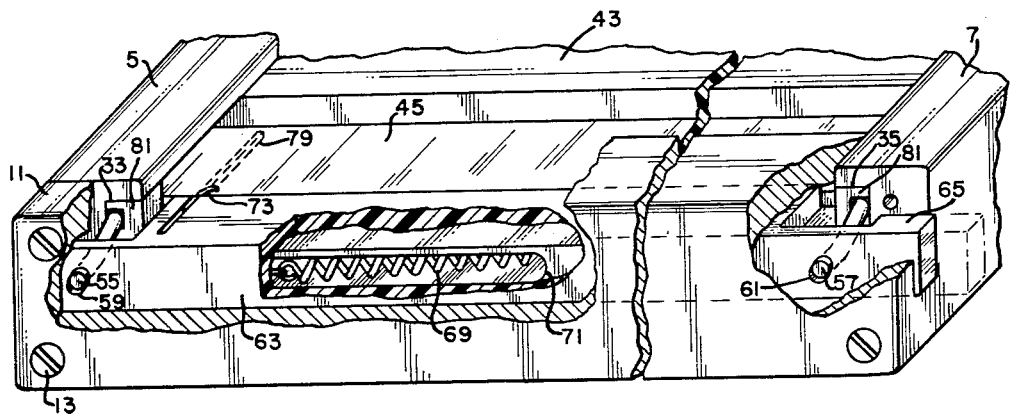
FIG. 2 is an enlarged, contracted, isometric end view of the invention, partly in section.
Figure 3:
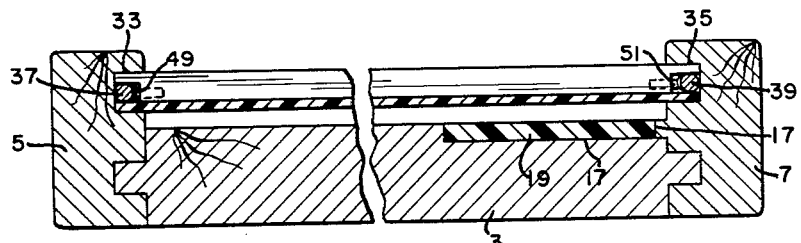
FIG. 3 is a cross-sectional view taken along the line 3—3 of FIG. 1.
Figure 4:
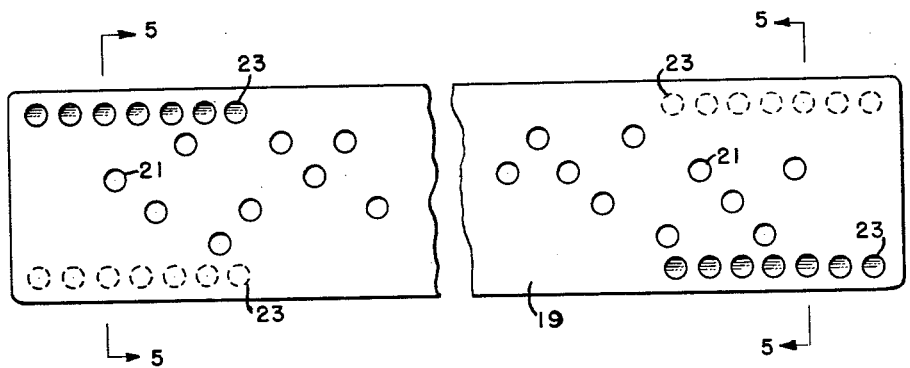
FIG. 4 is a top plan, contracted view of the coded rule.
Figure 5:
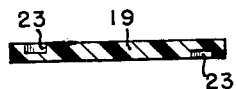
FIG. 5 is a cross-sectional view taken along the line 5—5 of FIG. 4.
Figure 7:
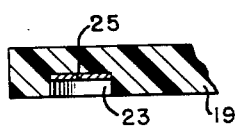
FIG. 7 is a cross-sectional view taken along the line 7—7 of FIG. 6.
Figure 6:
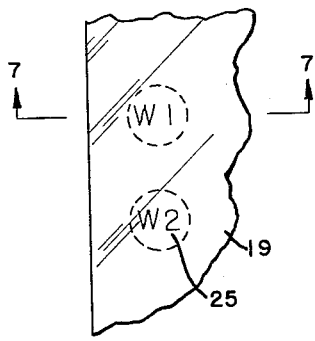
FIG. 6 is an enlarged, fragmental, top plan view of the coded rule.
Figure 8:
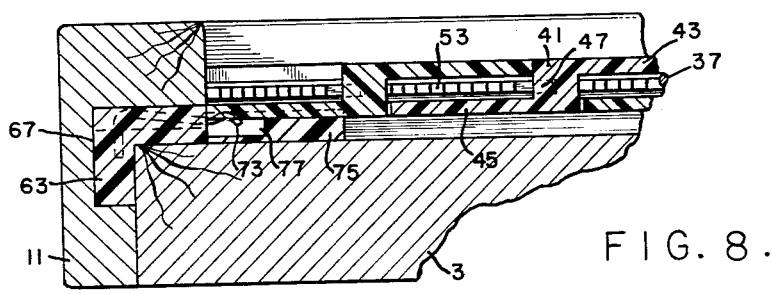
FIG. 8 is an expanded, fragmental, cross-sectional view taken along the line 8—8 of FIG. 1.
Figure 9:
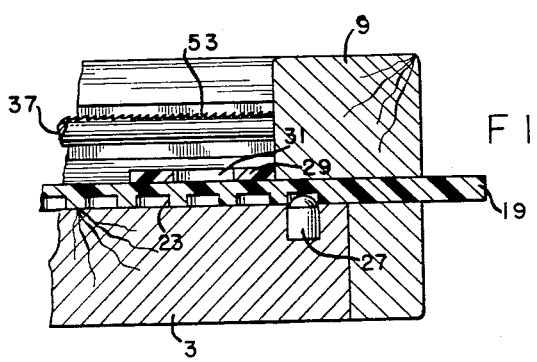
FIG. 9 is an expanded, fragmental, cross-sectional view taken along the line 9—9 of FIG. 1.

In FIG. 1, reference numeral 1 generally refers to the frame having a rectangularly shaped wooden base 3, with wooden left side 5 and wooden right side 7 glued or otherwise suitably secured to base 3. The wooden top end 9 and wooden front end 11 are removably secured to sides 5 and 7 by screws 13 (only the screws 13 which secure the front end are shown). For purposes of structural rigidity, tongue and groove joints are utilized in the assembly of the base 3 and sides 5, 7.

Formed in the right hand top portion of base 3 and longitudinal relative to base 3 is a longitudinal slot 15 similarly configured to and aligned with cut out portion 17 in top end 9. The slot 15 and cut out portion 17 are configured complemental to a longitudinal coded rule 19

2 to allow rule 19 to be freely received and reciprocated therein.

With reference to FIGS. 4, 5, 6, 7 and 9, coded rule 19 is a flat, longitudinal piece of suitable material such as Plexiglas. The function of openings 21 formed through rule 19 will hereinafter be described. At each end of rule 19 are two columns of seven detent recesses 23 formed therein with indicia 25 in five of the lower recesses of each column arranged therein for viewing opposite to the manner in which the recesses are formed. It should be appreciated that the two columns of recesses 23 at each end of rule 19 are formed therein opposite to each other.

Suitably secured in the upper portion of base 3 is a spring loaded detent assembly 27 for engagement with one of the recesses 23 of rule 19 for purposes of locking rule 19 in place upon relief of detent 27 in one of the recesses 23.

Glued or otherwise suitably secured to base 3 and emplaced against the logitudinal side portion of top end 9 is an upper abutment plate 29 having a view opening 31 formed therethrough. Plate 29 is preferably of opaque plastic material. Plate 29 is arranged horizontally relative to longitudinal slot 15 and in alignment with the top surface of cut out portion 17 thereby permitting unrestricted reception and reciprocation in slot 15 and cut out portion 17 of rule 19.

Coded rule 19 is so arranged and configured that when it is inserted through cut out portion 17 and engages slot 15, one of the four columns of seven detent recesses 23 will be in alignment with both detent assembly 27 and view opening 31.

Coded rule 19, as formed and arranged, permits five of its recesses 23 of each column to engage the detent 27 for a total of twenty viewed and indicated positions. This factor arises from the fact that dimensionally the distance between detent 27 and opening 31 is twice the distance between the recesses 23.

Left side 5 and right side 7 have longitudinally formed therewith longitudinal slots 33 and 35, respectively. Formed in each side of the top end 9 facing cross-sectionally slots 33 and 35 are holes (not shown) for purposes of receiving the end portions of left ratchet rod 37 right ratchet rod 39 arranged to be in longitudinal alignment with their respective slots 33 and 35.

Ten sliding rules 41 of suitable plastic material, each one of which has an upper opaque section 43 and a lower transparent section 45 oppositely arranged to be offset from the other by a spacer section 47 therebetween occupy and reciprocate within the confines of slots 33 and 35. The upper and lower sections of the rules 41 are so arranged and configured such that the opaque section 43 of a lower adjacent rule will freely guide over and abut against the lower longitudinal side portion of the opaque section 43 of an upper adjacent rule.

The spacer section 47 of each rule 41 is not coterminous with each longitudinal end portion of the upper opaque section 43 and lower transparent section 45 for the designed purpose of forming thereby shoulders in which to guide ratchet rods 37 and 39 and ride upon same.

Left spring pawl 49 and right spring pawl 51, arranged to be downwardly depending, are imbedded or otherwise suitably secured to each longitudinal terminal portion of spacer section 47 for purposes of engagement with and retention by serrations 53 formed on an arcuate portion of the surfaces of rods 37 and 39. The pawls and serrations are arranged and constructed that upon engagement of the pawls with the serrations, downward movement of the sliding rules 41 is prevented in the one direction with, however, free movement of sliding rules 41 in the upward direction.

Engaging respective slots 59 and 61 formed in locking arm 63 are crank 55 and 57 downwardly depending from the terminal portions of respective rods 37 and 39. Locking arm 63 has formed therewith a finger release 65 outwardly extending from the right of front end 11. A complemental slot 67 formed within front end 11 allows locking arm 63 to be received and guided therein.

Rods 37 and 39 and locking arm 63 are arranged and constructed that when locking arm 63 is in its extreme right hand position, the serrations 53 of rods 37 and 39 are free of engagement by pawls 49 and 51. Reciprocation of rods 37 and 39 to their disengaged position is effectuated by the reciprocation effectuated by the engagement of cranks 55 and 57 by respective crank slots 59 and 61 of locking arm 63. Locking arm 63 is biased into this extreme right hand position by tension spring 69 suitably secured to arm 63 and within a slot 71 formed in base 3 and which slot 71 allows unrestricted movement of spring 69 therein.

Locking arm 63 is L-shaped and rides upon front end portion of base 3. The slots 59 and 61 are formed in the lower leg portion of arm 63. Imbedded or otherwise suitably secured to the upper leg portion of arm 63 is a detent spring 73 for locking engagement and relief within a groove indent 79 formed in the left hand underside portion of the lower transparent section 45 of the last sliding rule 41.

Lower abutment plate 75 horizontally disposed relative to base 3 and glued or otherwise suitably secured therewith has a cut out portion 77 formed in its left hand portion to allow unhindered reciprocation of 73 therein. The terminal portion of detent spring 73 is disposed angularly downward below the top surface of plate 75 over which the transparent section 45 of the last sliding rule 41 rides in order that the last rule 41 may be moved fully downward without binding or engaging the end of spring 73.

When the last sliding rule 41 is moved fully downward, movement of locking arm 63 to the left will cause its carried detent spring 73 to engage and be relieved in groove indent 79 while at the same time reciprocating the serrations 53 carried by rods 37 and 39 to an engageable position as described previously.

When the last sliding rule 41 is moved upwardly sufficiently to free groove indent 79 from engagement by detent spring 73, the serrations 53 carried by rods 37 and 39 will be reciprocated to their unengageable position by the biasing action of spring 69 as described previously.

Two retainers 81 each having a main web and depending flanges normal to the terminal portions of the web are utilized for inserting engagement with slots 33 and 35 adjacent the cranks 37 and 39. The flanges being of a positive tolerance relative to the complement of the cross-sectional configuration of slots 33 and 35, these retainers allow themselves to be wedged into position. The rods 37 and 39 are freely received and aligned between the flanges of each retainer.

The inner side portions of sides 5 and 7 and the longitudinal side portions of plates 29 and 75 are arranged and constructed to receive therein the examination card 83 of standard size 8½ by 11 paper.

With all ten sliding rules moved downwardly to their extreme limit and the rules locked in place by movement of locking arm 63 to its extreme leftward position, only one question zone of the ten question zones horizontally disposed and arranged on card 83 to configure to the ten sliding rules 41 will be exposed to the student.

After the student has worked upon the first zone he moves the first sliding rule 41 upwardly thereby exposing the second question zone for work. It should be appreciated from the previous description of the locked position of the locking arm 63 that only upward movement of the sliding rules 41 may be effectuated.

Each question zone contains either one multiple choice type of question (see question "3" of FIG. 10) or constructive response type of question (see question "4" of FIG. 10), or a combination multiple choice and constructive response types of questions (see questions "8," "9" of FIG. 11). In the combination of questions for a zone, the multiple choice type of question will always be placed to the right of the constructive response type of question.

With respect to the constructive response type of question, the opaque upper section 43 will expose only the question. When the sliding rule 41 is moved upwardly, its lower transparent section 45 will expose the question and the open space between section 45 and the succeeding section 43 will expose the answer.

With respect to the multiple choice type of question the student has a choice of answers A, B, C, or D, one of which is correct. The correct answers to multiple choice questions are drafted to correspond to one selected position, for example position W2, of the coded rule 19. The information for the drafting of multiple choice questions in order to utilize a particular position of the coded rule 19 is obtained from master code sheet 85 shown in FIG. 12.

The instructor emplaces the examination card 83 and then inserts coded rule 19 to the particular position such that the indicia of that particular position will appear in view opening 31.

The right hand part of the upper opaque section 43 of each sliding rule 41 has four openings 87 formed therethrough. The openings 87 are in alignment with the four possible answers to the multiple choice questions of the card 83. The student reads the first question, selects his answer and takes his pencil and inserts same through the particular opening 87 and attempts to press the pencil point through the card. Inasmuch as the openings 21 formed on rule 19 are horizontally disposed relative to rule 19 in any one of the twenty possible positions of the rule in such a manner that only one opening 21 is available for alignment with one of the openings 87 of section 43, if the student's answer is correct his pencil point will pierce the card 83 and enter opening 21; if incorrect, the effect of the attempted answer will merely mark the card 83 to thereby indicate the number of times he has attempted to select the correct answer.

It should be further mentioned that inasmuch as the function of card 83 is to be worked upon rather than having the card perform the function of operating the device, ordinary standard 8½ by 11 inch paper can be utilized as the examination card 83. Hence the cards can have the question zones mimeographed thereon. The clearance between the bottom of section 45 and the top surface of base 3 is such that twenty sets of cards may be inserted in the device for use in giving examinations of the constructive response type.

The significance of coded rule 19 apart from this invention and for use with other instructive devices utilizing arrangements of opening to determine whether the answers to multiple choice questions are correct should be appreciated. The effect of twenty rules with arrangements of openings therethough is achieved by one rule.

The significance of the detent mechanism apart from this invention and for use with other devices requiring reciprocating movement of members normal to each other should be appreciated. Another factor of significance is the minimal thickness of the members carrying the detent mechanism. If a conventional detent mechanism were employed, the thickness of the members would have to be many times the thickness utilized in order to provide housing strength for the detent mechanism.

Having described my invention, I claim:

1. A teaching device comprising a frame, sliding rules, ratchet rods and a locking arm; said frame carrying said sliding rules, ratchet rods and locking arm, said frame releasably receiving an examination card beneath said sliding rules, said sliding rules having pawls and being movable upwardly and downwardly in said frame, said ratchet rods having depending cranks and having serrations formed therein, said locking arm having crank slots formed therein, said cranks being operatively engaged with said crank slots, one of said sliding rules having an indent formed therein, said locking arm carrying a spring detent, said locking arm having a discrete inoperative position and a discrete locking position of movement whereby said crank slots move said cranks thereby reciprocating said ratchet rods and positioning said serrations for engagement by said pawls to prevent downward movement of said sliding rules and said spring detent engages said indent in locking relationship.

2. The subject matter as claimed in claim 1, wherein said frame and locking arm mount therebetween a tension spring, said tension spring has tension imposed upon movement of said locking arm to its locking position, said tension spring is relieved and returns said locking arm to its inoperative position upon release of said spring detent from said indent whereby said crank slots move said cranks thereby reciprocating said ratchets and releasing said serrations from said pawls.

3. The subject matter as claimed in claim 1, wherein each sliding rule has an upper opaque section and a lower transparent section, said upper opaque section and lower transparent section of each of said sliding rules are oppositely arranged and disposed offset from the other, each of said upper sections is movable over the lower transparent section of a preceding sliding rule, said sliding rules are aligned with the zones of constructive response type of questions on said examination card, said sliding rules are arranged and disposed with respect to said zones of questions such that the constructive response question of the first of said zones is exposed for viewing, and, upon completion of said first question and moving of the first sliding rule upwardly, the answer to said first question is exposed for viewing through the lower transparent section of said first sliding rule, and such that a constructive response question of a succeeding zone is exposed for viewing, and, upon completion of each succeding question and moving of its respective sliding rule upwardly, each answer to its preceding question is exposed for viewing through lower transparent section of its respective sliding rule.

4. The subject matter as claimed in claim 1, wherein said examination card has multiple choice type zones of questions thereon with indicated possible answers, each of said sliding rules has openings aligned with said indicated possible answers, said frame receives therein a coded rule, said coded rule has means cooperating with said indicated possible answers of said examination card and with said openings of said sliding rules to determine the correctness of answers selected from said indicated possible answers to said multiple choice type questions.

5. The subject matter as claimed in claim 4, wherein said frame carries a detent, said coded rule has a plurality of recesses formed therein, and said detent is engageable with one of said recesses to permit thereby positioning of said coded rule in a plurality of positions for separate and distinct arrangements of answers to said multiple choice type questions corresponding to each position of said coded rule.

6. The subject matter as claimed in claim 5, wherein said coded rule has indicia therewith corresponding to the plurality of positions of said coded rule and said frame has a view opening formed therein for viewing said indicia.

7. The subject matter as claimed in claim 1, wherein each sliding rule has an upper opaque section and a lower transparent section, said upper opaque section and lower transparent section of each of said sliding rules are oppositely arranged and disposed offset from the other, wherein said examination card has multiple choice type of zones of questions thereon with indicated possible answers, each of said sliding rules has openings in columnar arrangement formed therethrough, corresponding to, and in alignment with said indicated possible answers, said frame receives therein a coded rule, said coded rule has openings formed therethrough, each one of said openings in said coded rule is a predetermined correct answer to and is in alignment with one of said indicated possible answers of one question zone, and wherein said frame carries a detent, said coded rule has a plurality of recesses formed therein, and said detent is engageable with one of said recesses to permit thereby positioning of said coded rule in a plurality of positions for separate and distinct arrangements of said openings of said coded rule corresponding to each of its positions.

8. The subject matter as claimed in claim 4, wherein said coded rule is of a flat, longitudinal configuration, and said frame has a slot and cut out portion formed therein complemental to said coded rule configuration for receiving therein said coded rule.

9. The subject matter as claimed in claim 5, wherein said coded rule is of a flat, longitudinal configuration and said frame has a slot and cut out portion formed therein complemental to said coded rule configuration for receiving therein said coded rule.

10. The subject matter as claimed in claim 9, wherein said coded rule has two sides, each of said sides has an upper and a lower portion, and wherein said plurality of recesses formed in said coded rule comprise recesses formed in said upper and lower portions of each of said sides.

11. The subject matter as claimed in claim 7, wherein said coded rule is of a flat longitudinal configuration, and said frame has a slot and cut out portion formed therein complemental to said coded rule configuration for receiving therein said coded rule.

12. The subject matter as claimed in claim 11, wherein said coded rule has two sides, each of said sides has an upper portion and a lower portion, and wherein said plurality of recesses formed in said coded rule comprise recesses formed in said upper and lower portions of each of said sides.

13. A teaching device comprising a frame, ratchet rods, sliding rules and a locking arm; said frame having a base, left side, right side, top end and front end, each of said sides having formed therewith a longitudinal slot, each of said slots receiving therein one of said ratchet rods, each of said sliding rules having an upper section, a lower section and a spacer section, said upper section and lower section being oppositely arranged and disposed offset from the other by said spacer section, said upper and lower sections being received in reciprocable relationship with said longitudinal slots, said upper, lower and spacer sections of each sliding rule forming shoulders at their longitudinal end portions, said shoulders guiding therein said ratchet rods and riding upon said ratchet rods, said sliding rules by their said shoulders being movable upwardly and downwardly on said ratchet rods, said spacer sections having terminal portions, said terminal portions having imbedded therein spring pawls, said ratchet rods having serrations formed therein, said spring pawls being engageable with said serrations to prevent downward movement of said sliding rules, said frame having a complemental slot formed in said front end, said complemental slot receiving therein and guiding a locking arm, said locking arm having crank slots formed therein, said ratchet rods having terminal portions, said terminal portions of said ratchet rods having depending cranks, said cranks being operatively engaged by said crank slots, one of said sliding rules being arranged and disposed adjacent said front end and having an indent formed therein, said locking arm carrying a spring detent engageable with said indent, said frame and locking arm mounting therebetween a tension spring, said locking arm having a discrete inoperative position and a discrete locking position, upon movement of said locking arm to its discrete locking position tension being imposed upon said tension spring, said crank slots move said cranks thereby reciprocating said ratchet rods and positioning said serrations for engagement by said spring pawls to prevent downward movement of said sliding rules and said spring detent engages said indent in locking relationship, and upon sufficient movement upwardly of said sliding rule adjacent said front end said indent being released from said spring detent, said tension imposed upon said tension spring being relieved thereby returning said locking arm to its discrete inoperative position and said crank slots moving said cranks thereby reciprocating said ratchet rods and releasing said serrations from said pawls, and said frame releasably receiving an examination card beneath said sliding rules.

14. The subject matter as claimed in claim 13, wherein said upper section is opaque and said lower section is transparent, each of said upper sections is movable over the lower transparent section of a preceding sliding rule, said sliding rules are aligned with the zones of constructive response type of questions on said examination card, said sliding rules are arranged and disposed with respect to said zones of questions such that the constructive response question of the first of said zones is exposed for viewing, and, upon completion of said first question and moving of the first sliding rule upwardly, the answer to said first question is exposed for viewing through the lower transparent section of said first sliding rule, and such that a constructive response question of a succeeding zone is exposed for viewing, and, upon completion of each succeeding question and moving of its respective sliding rule upwardly, each answer to its preceding question is exposed for viewing of its respective sliding rule.

15. The subject matter is claimed in claim 13, wherein said examination card has multiple choice type of zones of questions thereon with indicated possible answers, each of said sliding rules has openings in columnar arrangement formed therethrough, corresponding to, and in alignment with said indicated possible answers, said frame receives therein a coded rule, said coded rule has openings formed therethrough, each one of said openings in said coded rule is a predetermined correct answer to and is in alignment with one of said indicated possible answers of one question zone, and wherein said frame carries a detent, said coded rule has a plurality of recesses formed therein, and said detent is engageable with one of said recesses to permit thereby positioning of said coded rule in a plurality of positions for separate and distinct arrangements of said openings of said coded rule corresponding to each of its positions.

16. The subject matter as claimed in claim 15, wherein said coded rule is of a flat, longitudinal configuration, said base has a longitudinal slot formed therein, said top end has a cut out portion therein, and said longitudinal slot and cut out portion are aligned and complemental to said coded rule configuration for receiving therein said coded rule.

17. The subject matter as claimed in claim 16, wherein said coded rule has two sides, each of said sides has an upper portion and a lower portion, and wherein said plurality of recesses formed in said coded rule comprise recesses formed in said upper and lower portions of each of said sides.

18. The subject matter as claimed in claim 13, wherein said examination card has zones of constructive response type questions thereon and zones of multiple choice type questions thereon, said upper section is opaque and said lower section is transparent, each of said upper section is movable over the lower transparent section of a preceding sliding rule, said sliding rules are aligned with said zones of constructive response type of questions on said examination card, said sliding rules are arranged and disposed with respect to said zones of constructive response type questions such that the constructive response type question of the first of said zones is exposed for viewing, and, upon completion of said first constructive response type question and moving of its respective sliding rule upwardly, the answer to said first constructive response type question if exposed for viewing through the lower transparent section of its respective sliding rule, and such that a constructive response type question of a succeeding zone is exposed for viewing, and, upon completion of each succeeding constructive response type of question and moving of its respective sliding rule upwardly, each answer to its preceding constructive response type question is exposed for viewing through the lower transparent section of its respective sliding rule; and wherein said multiple choice type questions have indicated on said examination card possible answers thereto, each of said sliding rules has openings in columnar arrangement formed therethrough, corresponding to, and in alignment with said indicated possible answers, said frame receives therein a coded rule, said coded rule has openings formed therethrough, each of said openings in said coded rule is a predetermined correct answer to and is in alignment with one of said indicated possible answers of one multiple choice question zone, and wherein said frame carries a detent, said coded rule has a plurality of recesses formed therein, and said detent is engageable with one of said recesses to permit thereby positioning of said coded rule in a plurality of positions for separate and distinct arrangements of said openings of said coded rule corresponding to each of its positions.

19. The subject matter as claimed in claim 18, wherein said examination card has zones of constructive response type questions thereon, zones of multiple choice type questions thereon and zones of combinations of constructive response and multiple choice type questions thereon.

References Cited in the file of this patent

UNITED STATES PATENTS

| | | |
|---|---|---|
| 705,302 | Rose | July 22, 1902 |
| 1,023,014 | Hanson | Apr. 9, 1912 |
| 1,696,702 | Watlington | Dec. 25, 1928 |
| 2,169,266 | Matter | Aug. 15, 1939 |
| 2,221,303 | Shipley | Nov. 12, 1940 |
| 2,373,498 | Parmenter | Apr. 10, 1948 |
| 2,540,363 | Wistor | Feb. 6, 1951 |
| 2,937,455 | Perkins | May 24, 1960 |
| 3,095,654 | Cummings | July 2, 1963 |
| 3,096,092 | Bredehorn | July 2, 1963 |